(12) United States Patent
Zhou et al.

(10) Patent No.: US 9,684,821 B2
(45) Date of Patent: Jun. 20, 2017

(54) METHOD AND APPARATUS FOR USER RECOGNITION

(75) Inventors: Wei Zhou, Beijing (CN); Guang Yang, Beijing (CN); Xiaojun Ma, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/373,183

(22) PCT Filed: Jan. 20, 2012

(86) PCT No.: PCT/CN2012/070654
§ 371 (c)(1),
(2), (4) Date: Jul. 18, 2014

(87) PCT Pub. No.: WO2013/107038
PCT Pub. Date: Jul. 25, 2013

(65) Prior Publication Data
US 2015/0055822 A1    Feb. 26, 2015

(51) Int. Cl.
| | |
|---|---|
| *G06K 9/00* | (2006.01) |
| *G06F 3/01* | (2006.01) |
| *H04N 5/232* | (2006.01) |
| *G06F 21/32* | (2013.01) |
| *G06F 21/36* | (2013.01) |

(52) U.S. Cl.
CPC ......... *G06K 9/00335* (2013.01); *G06F 3/017* (2013.01); *G06F 21/32* (2013.01); *G06F 21/36* (2013.01); *H04N 5/23219* (2013.01)

(58) Field of Classification Search
CPC ..... G06K 9/00335; G06F 3/017; G06F 21/32; G06F 21/36; H04N 5/23219
See application file for complete search history.

(56) References Cited

U.S. PATENT DOCUMENTS

| | | | |
|---|---|---|---|
| 7,340,077 B2 * | 3/2008 | Gokturk | G06F 3/017 348/208.14 |
| 7,593,552 B2 | 9/2009 | Higaki et al. | |
| 8,019,129 B2 | 9/2011 | Imamura | |
| 8,196,066 B1 * | 6/2012 | Ouyang | G06F 3/04883 715/708 |
| 2005/0100198 A1 | 5/2005 | Nakano et al. | |

(Continued)

FOREIGN PATENT DOCUMENTS

| | | |
|---|---|---|
| CN | 101482772 | 7/2009 |
| CN | 201955856 | 8/2011 |

(Continued)

OTHER PUBLICATIONS

Lee et al: "Designing a Gesture-based Interaction with an ID Tag"; 2010 IEEE Int'l Conf. on Systems, Man and Cybernetics; pp. 2220-2225.

(Continued)

*Primary Examiner* — Shefali Goradia
(74) *Attorney, Agent, or Firm* — Myers Wolin, LLC

(57) ABSTRACT

A method for user recognition, comprising receiving user information from an information unit of a user; detecting the user face in a captured user image; and recognizing the user identity in the captured image according to a predetermined gesture associated with the user information and performed by the user.

6 Claims, 4 Drawing Sheets

(56) References Cited

U.S. PATENT DOCUMENTS

| | | |
|---|---|---|
| 2006/0054708 A1 | 3/2006 | Koo et al. |
| 2007/0003914 A1* | 1/2007 | Yang ............... G06F 9/4446 434/236 |
| 2008/0059578 A1* | 3/2008 | Albertson ............ G06F 3/016 709/204 |
| 2008/0170776 A1* | 7/2008 | Albertson ............ G06F 21/35 382/154 |
| 2010/0269072 A1 | 10/2010 | Sakata et al. |
| 2011/0001813 A1 | 1/2011 | Kim et al. |
| 2011/0093820 A1* | 4/2011 | Zhang ................ A63F 13/06 715/863 |
| 2011/0221768 A1 | 9/2011 | Hasegawa |
| 2011/0242305 A1 | 10/2011 | Peterson et al. |
| 2011/0248851 A1 | 10/2011 | Pham |
| 2011/0273551 A1* | 11/2011 | Yang ................ G06F 3/017 348/77 |
| 2011/0304541 A1* | 12/2011 | Dalal ................ G06F 3/017 345/158 |
| 2013/0058583 A1* | 3/2013 | Gallagher .......... G06K 9/00684 382/224 |

FOREIGN PATENT DOCUMENTS

| | | |
|---|---|---|
| GB | 2428802 | 2/2007 |
| JP | 6161652 A2 | 6/1994 |
| JP | 2004-362283 A2 | 12/2004 |
| JP | 2005-092419 A2 | 4/2005 |
| JP | 2006268490 | 10/2006 |
| JP | 2009087095 | 4/2009 |
| JP | 2011060110 | 3/2011 |
| JP | 2011186892 | 9/2011 |
| WO | 2010/035477 A1 | 4/2010 |
| WO | WO2010035477 | 4/2010 |

OTHER PUBLICATIONS

Garg et al: "A Biometric Security Based Electronic Gadget Control Using Hand Gestures", 2009, Int'l Conf. on Ultra Modern Telecommunications & Workshops, pp. 1-8.
Search Report Dated Nov. 22, 2012.

* cited by examiner

METHOD AND APPARATUS FOR USER RECOGNITION

This application claims the benefit, under 35 U.S.C. §365 of International Application PCT/CN2012/070654, filed Jan. 20, 2012, which was published in accordance with PCT Article 21(2) on Jul. 25, 2013 in English.

FIELD OF THE INVENTION

This invention relates to a method and apparatus for user authentication and registration according to a predetermined gesture performed by the user.

BACKGROUND

Smart environments should be able to identify the users so that they can deliver personalized services. For example, a smart TV can recommend programs based on the identity of the user; a smart store can recognize its regular customers and provide more personalized services; a smart home can identify the family members and remind them of important messages.

In order to achieve the smart environment, a system which supports and realizes user authentication and registration is very critical. A simple and common method is that a user inputs username and password by keyboard or another input device. However, this manner requires direct user intervention. Another authentication device performs authentication by using both physical characteristics such as a fingerprint and behavioural characteristics such as "motion" implemented by sliding a finger on the device (or sliding the device on a finger).

Face recognition is a substitution method for user authentication and registration since it is unobtrusive and allows the user to remain relatively passive. In a face recognition system, a face sample database is necessary. If there is no a pre-stored face database, face recognition cannot be conducted. In fact, in a public environment (such as in museum), it is hard to establish a public face database. In domestic environment, in the phase of initialization, there is also no face database.

Another method is to allow a user to take advantage of an RFID card or another wireless device which can indicate user identity. In a smart TV scenario, an RFID card can help complement user registration automatically. However, if there are several persons in front of the RFID reader, it is hard to distinguish who among the several users holds an RFID card and what is the relationship between the detected cards and the persons present by wireless signal analysis only.

Therefore, it is desirable to come up with a solution that can implement user authentication and registration effectively.

SUMMARY OF THE INVENTION

The invention concerns a method for user recognition. After a user face is detected by computer vision, the authentication and registration for this user can be carried out on condition that this user performs a specific gesture which has been recorded in the database. A specific gesture corresponds to a specific user among several users.

The invention concerns a method for user recognition, comprising receiving user information from an information unit of a user; detecting the user's face in a captured user image; and recognizing the user identity in the captured image according to a predetermined gesture associated with the user information and performed by the user.

The invention also concerns a user recognition system for implementing the above method, comprises a information receiving unit for receiving user information from a information unit of a user and a image capturing unit and a processing unit for detecting the user face in a captured user image and recognizing the user identity in the captured image according to a predetermined gesture associated with the user information and performed by the user.

BRIEF DESCRIPTION OF THE DRAWINGS

These and other aspects, features and advantages of the present invention will become apparent from the following description of an embodiment in connection with the accompanying drawings.

DETAILED DESCRIPTION OF THE INVENTION

Figure 1:
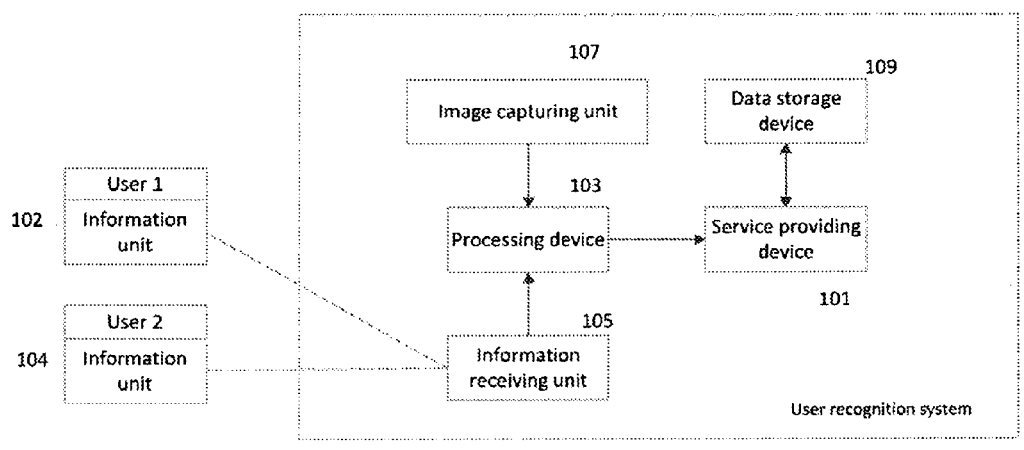
FIG. 1 is a block diagram showing the architecture of a user recognition system according to an embodiment of the invention.

FIG. 1 is a block diagram showing the architecture of a user recognition system 100 according to an embodiment of the invention. As shown in FIG. 1, the user recognition system 100 comprises a processing device 103, a service providing device 101, an information receiving unit 105, an image capturing unit 107 and a data storage device 109. The service providing device 101 is adapted to provide personalized service to different users. For example, a TV set can recommend programs based on the identity of the user, a smart device in a store recognizes its regular customers and provides more personalized services, a smart device at home identifies the family members and reminds them of important messages, or a network device for provides on-line business and on-line information exchange. The user identification is provided by the processing device 103 based on the user information recognition result.

The processing device 103 is adapted to handle operation of the user recognition system 100, and to perform a process flow to recognize a user. The processing device 103 includes one or more processors and associated memory, the computer programs or software of the process flow are stored in the memory, which can be used by the processor, e.g., to implement user recognition. The processor is representative of one or more stored-program control processors and these do not have to be dedicated to user recognition, e.g., the processor may also control other functions of user recognition system 100. The memory is representative of any storage device, e.g., random-access memory (RAM), read-only memory (ROM), etc.; may be internal and/or external to user recognition system 100; and is volatile and/or non-volatile as necessary.

The information receiving unit 105 is adapted to receive signal and data from information unit 102/104 of users, which records user's identity information. In the embodiment, the information unit 102/104 for example can be a RFID tag attached to the user's clothes and emitting an RF signal, or a smart card which is carried by the user and can be read by the reading device. The information receiving unit 105 can be an RFID receiver or a smart card reading device. However, the information unit and information receiving unit are not limited to the above examples.

In the embodiment, the RFID tags carried by users can be read from and written to. Before user authentication and registration, the related ID of users and specific gesture information have been written into the RFID tag's memory.

The storage format in the tags, according to the present embodiment, is as follows:

User ID Bits+Gesture Definition Bits+Reserved Bits

In the preferred embodiment, the Gesture definition information is recorded in the RFID card and sent to the RFID reader by RF signal, to help recognize the user accurately. After the RFID reader receives the Gesture definition information, the user recognition system 100 will know the gesture to be provided by the user for recognition so as to detect and process the captured image easily, and inform the image capturing unit 107 so as to capture the image based on the received gesture definition information.

The typical definition of a gesture comprises one or more among: a type of motion of one or more body parts (typically the face and hands), an area where the motion is performed (typically defined by the relative motion/movement of at least one of the user's body parts compared to another), a particular positioning or orientation of the user's body parts. A number of examples follow:

A motion is made above the user's face; —the motion may e.g. be a motion of the user's hand from left to right;

A motion is made below the user's face; the motion may e.g. be a motion of the user's hand from left to right;

A motion of a hand across the user's face from left to right;

A motion of a hand across the user's face from right to left;

Happens motion is made above the user's face, together with the user's face turning left at the same time;

A motion is made above the user's face, together with the user's face turning right at the same time;

A motion of the hand is made above the user's face, together with the user looking downwards;

A motion of the hand is made above the user's face, together with the user's face moving up;

A motion of the hand is made below the user's face, together with the user face turning left;

A motion of the hand is made below the user's face, together with the user face turning right;

A motion of the hand is made below the user's face, together with the user face move down;

A motion of the hand is made below the user's face, together with the user face move up;

A motion of the hand is made across the user's face from left to right, together with the user's face turning left;

A motion of the hand is made across the user's face from left to right, together with the user's face turning right;

A motion of the hand is made across the user's face from left to right, together with the user's face moving down;

A motion of the hand is made across the user's face from left to right, together with the user's face moving up;

A motion of the hand is made across the user's face from right to left, together with the user's face turning left;

A motion of the hand is made across the user's face from right to left, together with user's face turning right;

A motion of the hand is made across the user's face from right to left, together with the user face moving down;

A motion of the hand is made across the user's face from right to left, together with user's face moving up.

In a variant embodiment, the user holds an object in one of his hands while performing the motion. The object is typically an object which is easy to spot in the camera picture, in order to facilitate tracing of the motion.

In a preferred embodiment, the gesture is defined not only based on the movement of the hand itself, but also based on the relative position of the face and hand and the movement of face, so as to find the corresponding relationship between the face and hand(s) in the camera image, and to ensure those corresponding gestures can be easily detected based on image recognition technology. However, the gesture definition is not limited to the above examples, but can be any static gestures or dynamic gestures around the user's body and made by a user. According to the present embodiment, the storage format in RFID tags is:

User ID Bits+Reserved Bits

According to the present embodiment, the user gesture in the memory of the user recognition system 100 is defined to match the user ID. So after the RFID reader receives the user ID information from the RFID tag, the user recognition system 100 will know the gesture to be provided by the user for recognition according to the information in its memory.

Figure 2:
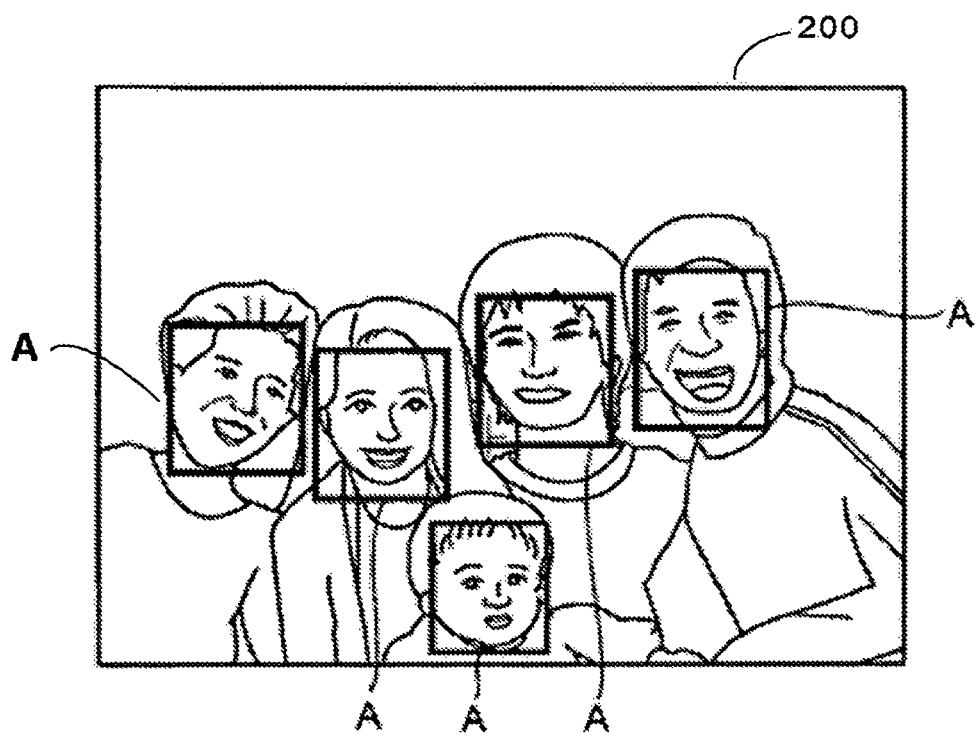
FIG. 2 is a diagram showing an example of an image obtained by face detection technology.

The image capturing unit 107 is adapted to cooperate with the processing device 103 to capture the user's image, detect the user's face, and recognize the user gesture. For example, the image capturing unit 107 can be a digital camera, a digital video camera, a webcam or another image sensor device (e.g. infrared). The image capturing unit 107 has a function of automatically detecting the face of a subject person when sensing a still image or a dynamic image (video sequence) as shown in FIG. 2. FIG. 2 shows an example of an image obtained using face detection technology by the image capturing unit 107. In FIG. 2, All user faces have been detected. The captured image will be sent to the processing device 103 for user recognition. The image capture and face detection technology is known in the art, and its detailed description is omitted herein. U.S. Pat. No. 8,019,129 of Keiichi Imamura provided more information about the face detection technology.

Figure 3:
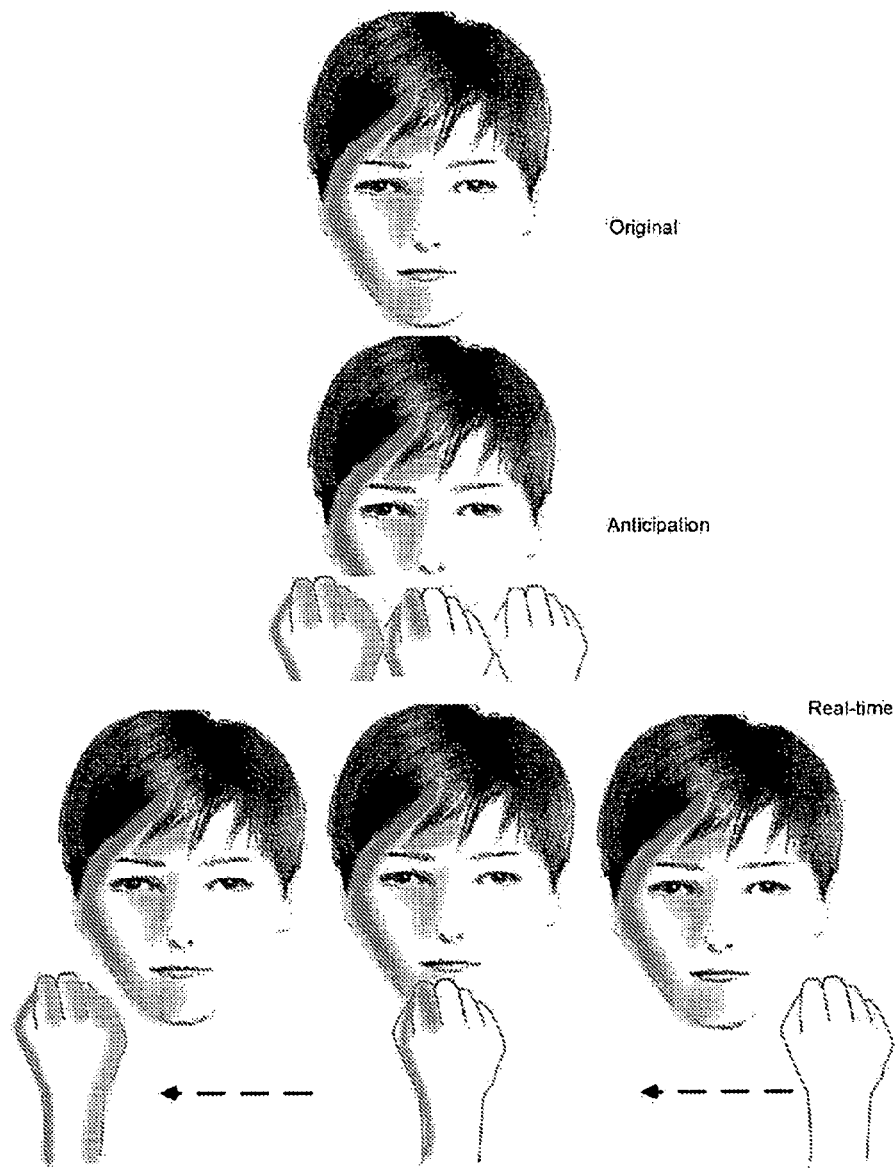
FIG. 3 is a diagram showing a gesture recognized by the user recognition system according to the embodiment of the invention.

According to the embodiment, after detecting that there exist faces in the image captured by the camera, and receiving the user ID information and user gesture information from the RFID tag, the processing device 103 will recognize the user gesture according from the captured image(s). In a preferred embodiment, the knowledge of the ROI (region of interest) where the defined gesture will appear in the image and direction of gesture is anticipated as shown in FIG. 3. Here, ROI is the region where the defined gesture will appear, for example, if the defined gesture is a motion of a hand below the user's face from left to right, the ROI will be the area including the face and below the face. The anticipation gesture includes several intermediate motions in the ROI as shown in FIG. 3. In addition, if there are five user faces detected in the image as shown in FIG. 2, and assuming three RFID tag signals are received, the ROI will include three gestures anticipated by the processing device 103. At least one of the three expected gestures will be captured by the image capturing unit 107 in the ROI so that personalized service can be provided by the service providing device 101.

FIG. 3 is a diagram showing a gesture recognized by the user recognition system 100 according to the preferred embodiment of the invention. In FIG. 3, the original face is detected by the image capturing unit 107. Based on the user ID information, user gesture definition information is obtained, and an expected gesture is thus known to the processing device 103. Here the original user face and the anticipated gesture can be displayed or not as required, and processed by the image capturing unit 107 and the processing device 103.

As shown in FIG. 3, after the original user face image and the anticipated gesture is obtained by the processing device, the user will carry out the defined gesture for recognition which is shown in FIG. 3 as the real time images which is performing by the user. The image capturing unit 107 can get the image of the gesture and send to the processing device 103 for user recognition. As shown in FIG. 3, the real time user face and gesture image are obtained by the image capturing unit 107. The real time gestures are compared with the anticipated gestures, and the user identity is recognized according to their similarity.

For example, the hand tracking technology can be used for gesture recognition, which includes considering a position of the hand in a previous image frame with respect to the hand position in a current image frame. By tracking motion or changes with respect to features that may be extracted from the exposed skin region being tracked, gesture analysis may be performed. In an exemplary embodiment, gesture analysis may be performed by comparing features from the exposed skin region being tracked to features anticipated by the processing device 103 according the user ID information or defined gesture. By determining a match (or substantial similarity within a threshold amount) between the anticipated features and the features extracted from the exposed skin region being tracked, a gesture corresponding to the specific gesture associated with the matched anticipated features may be recognized.

If the specific gesture which is recorded in the user RFID tag is detected, it means the authentication and registration process is performed successfully.

After successful user authentication and registration, the system can record individual user habits when he/she conducts the above gesture, such as that he/she likes to conduct gesture 1 on the upper left of face or he/she likes to conduct gesture 1 three times or he/she likes to conduct gesture 1 to pass ¾ of the face width. This habit information can be written into the RFID tag using the reserved bits. Furthermore, the user can use another gesture definition, instead of the original. The user can ask RFID reader to write the new gesture definition into the RFID card to replace the original.

Figure 4:
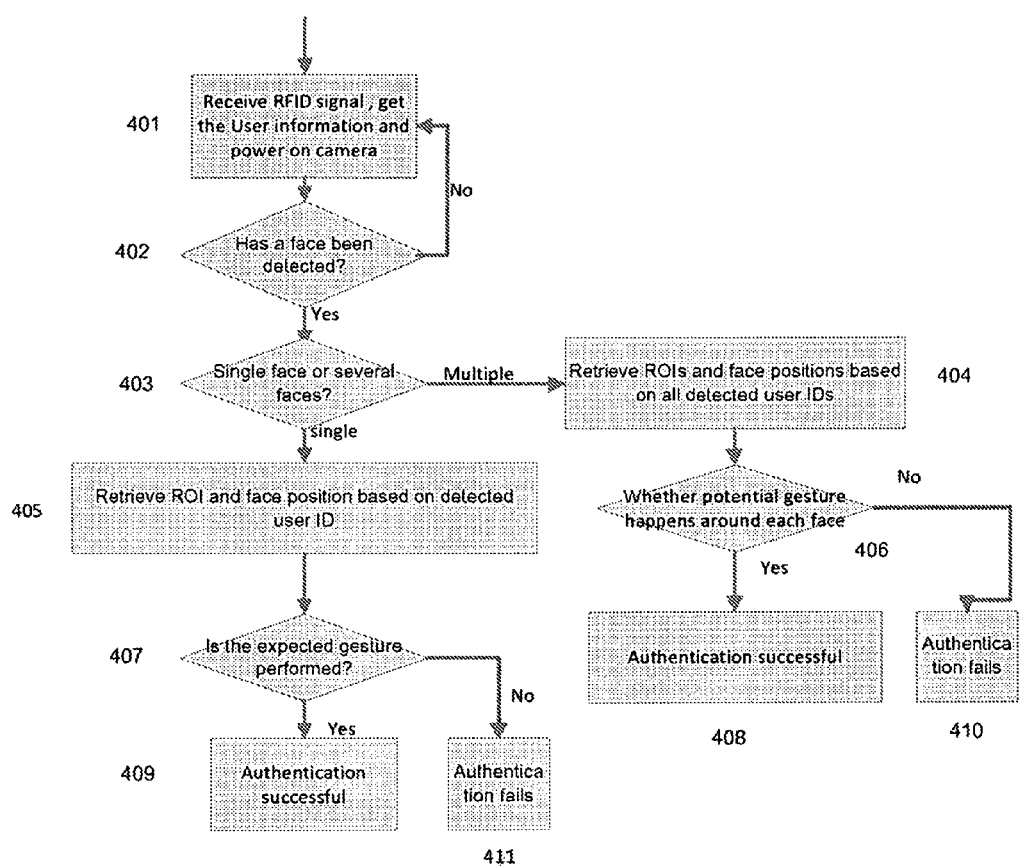
FIG. 4 is a flow chart showing a method for user recognition according to the embodiment of the invention.

FIG. 4 is a flow chart showing a method for user recognition according to the embodiment of the invention. As shown in FIG. 4, the user information is received from the information unit of the RFID tag by RF signal at step 401, then the image capturing unit 107 for example a camera is powered on. At step 402 the user face in the user image captured by the camera is detected to see whether a face exists in the image. If no, the system waits to receive the user information if there is, and if yes, go to the next step 403. At step 403, determine whether a single person or several people are present in the captured image, and based on the result implement a single person processing method or a multiple people processing method respectively. At step 405, for a single person, the location of the predetermined gesture associated with the user information is anticipated, to determine the potential Region of Interest of the gesture based on the user information and position of the user face in the camera image as shown by the anticipation image in FIG. 3. Then at step 407, capture the user image and recognize the user identity according to the location of the predetermined gesture, and if the required gesture is detected, that is the captured real time user gesture is similar to the anticipated gesture, the authentication is successful at step 409; and if the required gesture is not detected, the authentication fails at step 411.

At step 404, for multiple people, the location of the multiple predetermined gestures associated with the users are anticipated, to determine the multiple potential Regions Of Interest of the gestures based on the user information and position of the user faces in the camera image. Then at step 406, capture the user image and recognize the user identity according to the location of the predetermined gesture, and if one of the required gestures is detected, that is the captured real time user gesture is similar to the anticipated gesture, the authentication is successful at step 408; and if there is no detection of any of the expected gestures, the authentication fails at step 410.

According to the embodiment of the invention, using user face detection replacing user face recognition can simplify the processing complexity, and then the authentication and registration for this user's gesture can enhance the recognition precision.

Although an image capturing unit 107 and a processing device 103 are used as an embodiment to explain the invention, one skilled in the art knows that the two devices can be integrated into a single image capturing unit.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method for user recognition, the method comprising:
receiving, by information receiving circuitry, a signal containing user information, wherein the information receiving circuitry comprises a radio frequency identification (RFID) reader configured to receive user identification (ID) bits, gesture definition bits, and reserved bits from a radio frequency identification (RFID) tag;
capturing, by image capturing circuitry, an image of a user associated with the user information;
detecting, by processing circuitry, facial features of the user in the captured image;
detecting, by the image capturing circuitry, a location of a gesture associated with the received user information in the captured image;
recognizing, by the processing circuitry, a user identity based at least partially on a relative position of the gesture and a movement of the detected user face;
recording, by the processing circuitry, habits associated with the gesture; and
providing, by a service providing device, a personalized service in accordance with the user identity.

2. The method of claim 1, wherein the image capturing circuitry comprises a digital camera.

3. The method of claim 2, wherein the information receiving circuitry comprises a smart card reading device; and the user information includes a user identifier.

4. A device for user recognition, the device comprising:
a processor configured to receive, by information receiving circuitry, user information, wherein the information receiving circuitry comprises a radio frequency identification (RFID) reader configured to receive user identification (ID) bits, gesture definition bits, and reserved bits from a radio frequency identification (RFID) tag,
image capturing circuitry configured to capture an image of a user associated with the user information and detect a location of a gesture associated with the received user information in the captured image;

processing circuitry configured to:

detect facial features of the user in the captured image;

recognize a user identity based at least partially on a relative position of the gesture and a movement of the detected user face; and record habits associated with the gesture; and provide, via a service providing device, a personalized service in accordance with the user identity.

5. The device according to claim 4, wherein the image capturing circuitry comprises a digital camera.

6. The device according to claim 5, wherein the information receiving circuitry comprises a smart card reading device; and the user information includes a user identifier.

* * * * *